Patented Dec. 23, 1947

2,433,143

UNITED STATES PATENT OFFICE 2,433,143

PROCESS FOR RECOVERING PHENOL FROM A PHENOL-RESORCINOL MIXTURE

Harold W. Mohrman, Springfield, Mass., assignor to Monsanto Chemical Company, St. Louis, Mo., a corporation of Delaware No Drawing. Application November 16, 1944, Serial No. 563,803

2 Claims. (Cl. 260—621)

This invention is directed to the recovery of phenol from mixtures containing phenol and resorcinol.

Resorcinol is generally made commercially by the sulfonation of benzene followed by alkali fusion. It also may be recovered from coal tar residues. From either process, the crude resorcinol contains phenol in substantial amounts up to at least 25% of the weight of the mixture. Previous methods for purifying the resorcinol have been cumbersome and have resulted in substantial losses of the phenol.

It is an object of this invention to provide a method for recovering phenol from mixtures of phenol and resorcinol.

It is a further object of this invention to provide a method for recovering phenol from mixtures of phenol and resorcinol which will yield a useful and valuable by-product.

These and other objects are attained by treating a mixture of resorcinol and phenol with formaldehyde to form a fluid resorcinol-formaldehyde reaction product from which the phenol is removed by distillation and subsequently purified by further distillation or solvent extraction.

The following example is intended to be illustrative and is not to be construed as limiting the scope of the invention. Where parts are mentioned, they are parts by weight.

Example 962 parts of crude resorcinol containing 20% of phenol is placed in a suitable container such as a glass flask and 340 parts of 37% formalin is added, followed by 300 parts of water to aid in dissolving the resorcinol. The resulting mixture is heated at 40–50° C. until the resorcinol is completely dissolved. The reaction mixture is then heated to reflux at atmospheric pressure for 15 minutes. The phenol and water are then removed by distillation under reduced pressure at 120° C. When all the phenol and water have been removed, the reaction mixture is poured from the vessel and cooled. A hard, brittle, two-stage resorcinol formaldehyde resin in the first or fusible stage, containing no free phenol, is obtained. 180 parts of phenol are recovered from the distillate by solvent extraction.

The crude resorcinol may contain varying amounts of phenol, ranging from about 5% to about 25% of the weight of the mixture.

The amount of formaldehyde used according to this invention may be varied up to about 0.8 mol per mol of resorcinol. The upper limit is established by the amount of formaldehyde which will combine with resorcinol to yield a liquid resin when hot, from which the phenol can be distilled. At higher concentrations of formaldehyde, an infusible resin results from which the free phenol can be removed only with extreme difficulty by methods which render the resinous by-product substantially worthless. The preferred ratio of formaldehyde to resorcinol is from 0.5 to 0.7 mol of formaldehyde per mol of resorcinol.

The resinous by-product of the preferred ratio is a hard, brittle two-stage resorcinol-formaldehyde resin in the first or fusible stage. The resin may be used advantageously to modify phenolic, urea or melamine resins. The resin may also be used for molding, laminating and adhesive applications by incorporating hardening agents such as, for example, formaldehyde or hexamethylene tetramine.

37% formalin is shown in the example as the addendum to the crude resorcinol and is the preferred ingredient according to this invention. The solid form of formaldehyde, such as paraformaldehyde, may be used to replace the aqueous formalin.

No catalyst is required to accelerate or initiate the process of this invention. The absence of catalyst makes it possible to provide resins of improved electrical resistance.

The temperature at which the phenol and water are removed from the reaction mixture may be varied from about 90° C. to about 170° C. and is important in controlling the properties of the resorcinol-formaldehyde resin, especially the melting point of the resin which decreases with decreasing temperature of the distillation step.

By the process of this invention phenol may be recovered quantitatively from crude resorcinol simultaneously with the production of a valuable and useful resorcinol resin. In place of resorcinol-phenol mixtures other mixtures containing a highly reactive substituted phenol and relatively large quantities of phenol may be used, for example, 3,5-xylenol-phenol, catechol-phenol and pyrogallol-phenol mixtures.

It is to be understood that the description of the process of this invention is intended to be illustrative and that various modifications in the process and compositions described may be made without departing from the spirit and scope of the invention as defined in the appended claims.

I claim:

1. A process for recovering phenol from a mixture containing from 5 to 25% of phenol and 95 to 75% of resorcinol which comprises treating the mixture with 0.5 to 0.68 mol of formaldehyde per mol of resorcinol, removing the phenol from the reaction product by vacuum distillation at 90 to 170° C. and purifying the phenol.

2. A process for recovering phenol from a mixture containing from 5 to 25% of phenol and 95 to 75% of resorcinol which comprises treating the mixture with 0.5 to 0.68 mol of formaldehyde per mol of resorcinol in the mixture while in aqueous solution, removing the phenol from the reaction product by vacuum distillation at 90 to 170° C. and purifying the phenol.

HAROLD W. MOHRMAN.

REFERENCES CITED

The following references are of record in the file of this patent:

UNITED STATES PATENTS

| Number | Name | Date |
| --- | --- | --- |
| 1,214,414 | Berend | Jan. 30, 1917 |
| 1,802,390 | Novotny | Apr. 28, 1931 |

OTHER REFERENCES

Ellis, "Chemistry of Synthetic Resins," vol. I, page 371.